Patented Mar. 26, 1929.

1,706,590

UNITED STATES PATENT OFFICE.

HERMANN PLAUSON, OF NATERS, NEAR BRIG, SWITZERLAND, ASSIGNOR TO MINERAL A. G. BRIG, OF BRIG, SWITZERLAND, A SWISS COMPANY.

PROCESS FOR PREPARING BITUMINOUS EMULSIONS.

No Drawing. Application filed January 12, 1927, Serial No. 160,774, and in Italy July 31, 1926.

This invention relates to novel bituminous emulsions and processes for preparing them.

More particularly it relates to bituminous emulsions suitable for making roads such as emulsions of asphalt or asphaltic materials e. g. those derived from petroleum bases, and sold under the registered trade marks Mexphalte (M. P. 51°–57° C. combined carbon 17–21%) and Spramex (M. P. 38°–46° C. combined carbon 14–16%). Both these products are almost completely soluble in carbon bisulphide and in carbon tetrachloride.

Numerous process have been proposed for preparing such emulsions e. g. it has been proposed to mix the bituminous material with a saponifiable material such as a fatty acid and to agitate the mixture with an aqueous solution of caustic alkali or to use proteids or proteins in similar manner. It has been found that on keeping, especially when exposed to air, the stability of these emulsions is reduced, possibly through a slow reaction between the asphaltic acids and the soaps.

One object of the invention is to provide a process by which the bituminous material may be readily emulsified. Further objects are to provide emulsions which are stable; emulsions which are capable of dilution with water; and emulsions whose hygroscopic properties are valuable for the purpose of treating road surfaces.

The present invention comprises emulsions of the bituminous material which contain alkali carbonate and a neutral glyceride.

In a preferred form of the invention, a substantially neutral glyceride is emulsified with an aqueous solution of alkali carbonate and this emulsion is then agitated with the asphalt with the aid of heat. If the fats or oils contain small quantities of free fatty acids, they may be first neutralized by a small quantity of caustic alkali, but in any case we add sufficient carbonate so that the emulsion contains an excess thereof. The emulsions so obtained are of great stability apparently because the asphaltic acids do not react with the oils which have been neutralized and emulsified by carbonates, even in presence of atmospheric oxygen. Even if small quantities of soap are formed by neutralization of the oil, undesirable subsidiary reactions are substantially prevented by presence of an excess of carbonate.

Example.

50–60 parts by weight of asphaltic material sold under the registered trade mark "Spramex" are heated to a temperature of 120–130° C. In a subsidiary vessel provided with a stirrer 1½ parts of bone fat are emulsified with 40 parts of water and 2½–3 parts of potassium carbonate; the mixture is agitated till a homogenized emulsion of bone fat is obtained which does not contain free fatty acids. The emulsion is kept at 70–80° and the molten bitumen at a temperature of 120–130° C. is pumped therein by means of a pitch pump and the mixture is vigorously stirred. Complete emulsification occurs producing a brown emulsion of very great stability. If desired, the final product can be passed through a colloid mill or similar high speed disintegrator.

Sodium carbonate can be used instead of potassium carbonate. Small quantities, e. g. 0.1–2% caustic alkali can be added without any disadvantage.

Other bituminous materials or mixtures thereof can be treated in the same way. The emulsion so obtained can be diluted as required by the addition of a 1–5% solution of sodium or potassium carbonate while many known bitumen materials are coagulated by dilution with water.

The proportions of the ingredients may be varied in the above example and other fats or oils may be employed, e. g. fish oil, lard, butter, animal fat (kadaverfett), wool fat, palm oil, etc. The best results are obtained with fats which at 10–14° C. possess the density of vaseline.

It is further useful to treat the bitumen with volatile hydrocarbons or solvents, e. g. petroleum, benzine, chlorinated hydrocarbons, etc. since this increases the tackiness on drying. These may be added in small quantities e. g. 1–5%. The solvent may be added to the molten bitumen but is preferably added either before or after the bitumen to the fat emulsion, and emulsified therewith.

The emulsions can be used for building roads, for making cement impermeable, for treating walls and buildings, for application to roofs or as paints or for many other purposes.

It is preferred to use potassium carbonate instead of sodium carbonate because the hygroscopic properties of the potassium carbonate make it valuable for applying the material to road surfaces.

I declare that what I claim is:—

1. Process for making bituminous emulsions which comprises melting a bituminous substance and emulsifying same with an already prepared emulsion of a neutral glyceride in excess of alkali carbonate solution.

2. Process for making bituminous emulsions which comprises melting a bituminous substance and emulsifying same with an already prepared emulsion of a neutral glyceride in excess of potassium carbonate solution.

3. Process for making bituminous emulsions which comprises preparing an emulsion of a glyceride with excess of an alkali carbonate solution and caustic alkali not more than is required to neutralize the free acid contained in the glyceride, melting a bituminous compound and emulsifying same with said emulsion.

4. Process for making bituminous emulsions which comprises melting a petroleum base asphalt and emulsifying same in a previously prepared emulsion of a neutral glyceride in excess of a potassium carbonate solution.

5. Process for making bituminous emulsions which comprises emulsifying a volatile bitumen solvent and a bituminous substance with a previously prepared emulsion of a neutral glyceride in excess of an alkali carbonate solution.

6. Process of making bituminous emulsions which comprises emulsifying a volatile bitumen solvent with an emulsion of a neutral glyceride in excess of an alkali carbonate solution and thereafter emulsifying a molten bituminous compound with the mixture.

In witness whereof, I have hereunto signed my name this 7th day of December, 1926.

HERMANN PLAUSON.